V. G. APPLE.
ELECTRIC DISTRIBUTION SYSTEM.
APPLICATION FILED APR. 20, 1906.

1,034,561.

Patented Aug. 6, 1912.

4 SHEETS—SHEET 1.

Witnesses
Ray White
Harry R. LaSalle

Inventor
Vincent G. Apple
By Foree Bain and May, Attys.

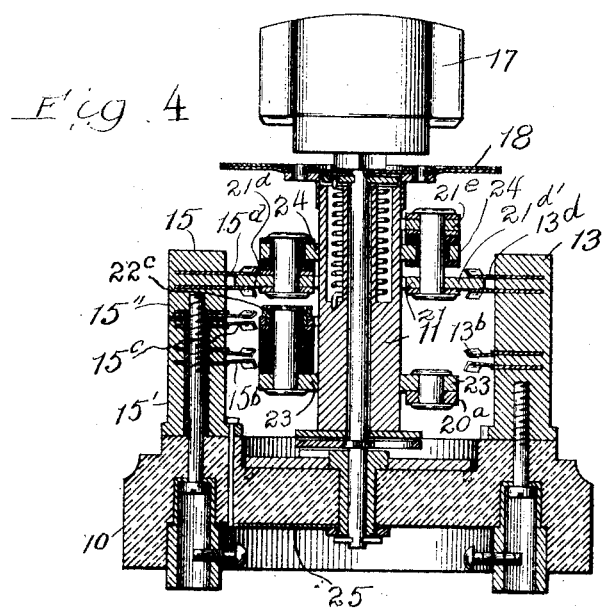
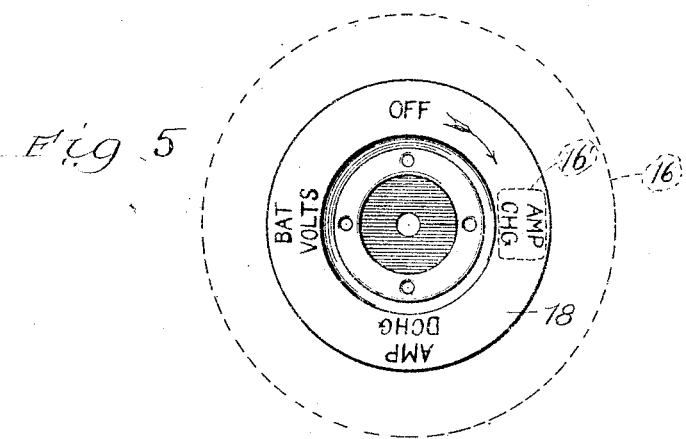

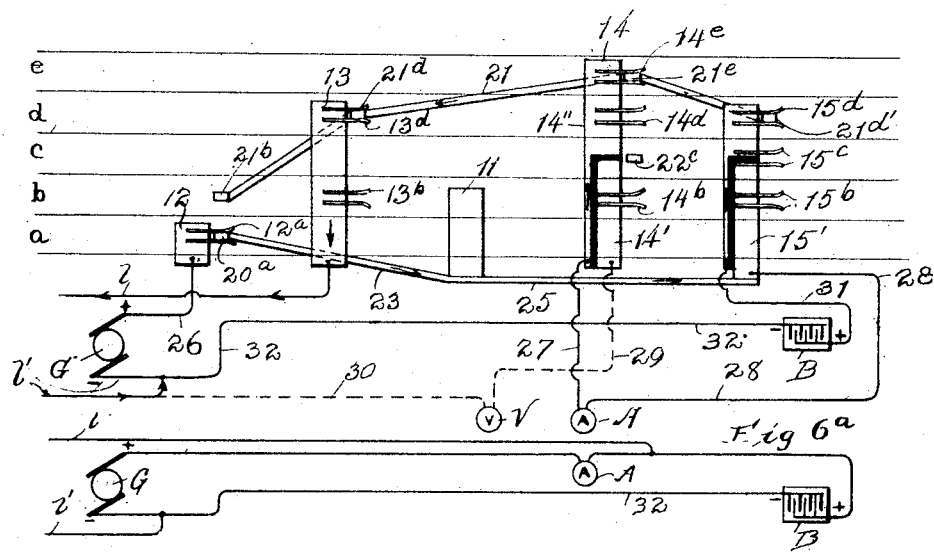
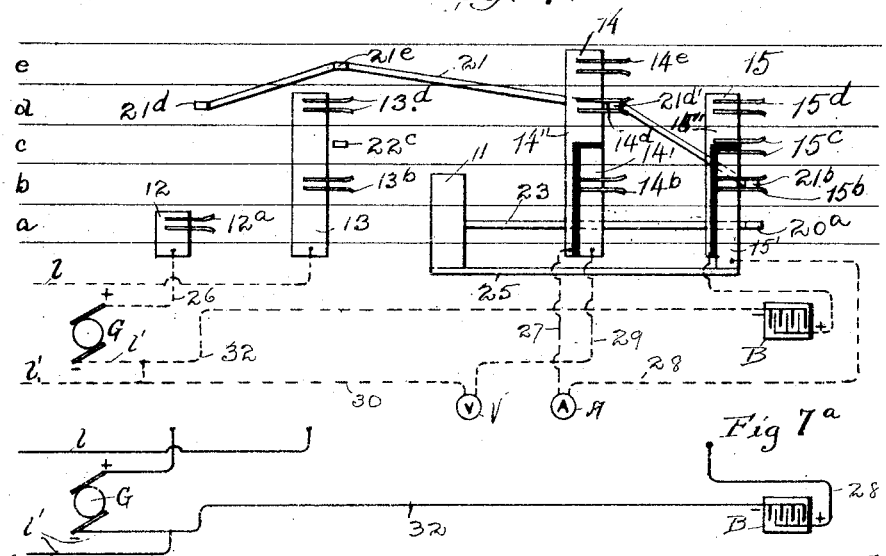

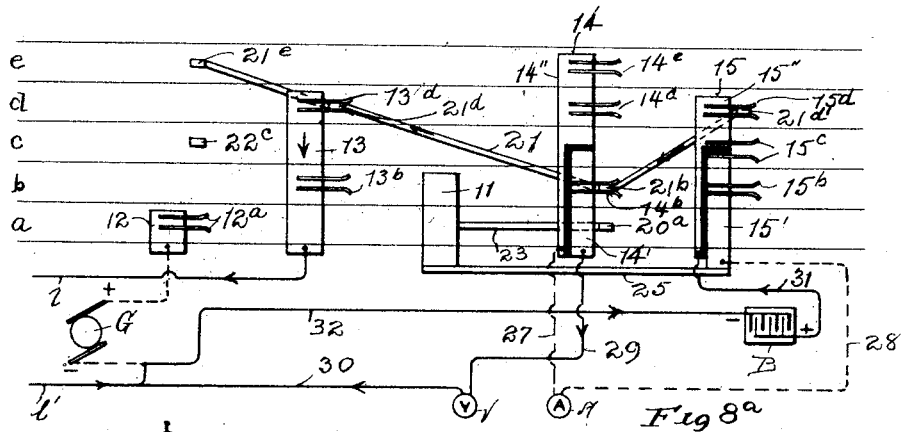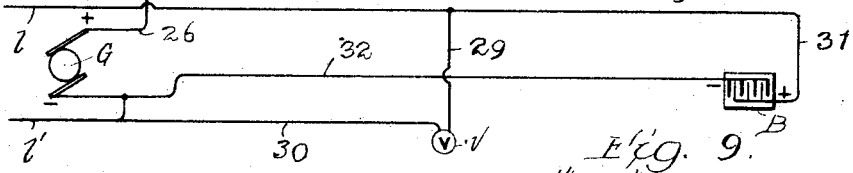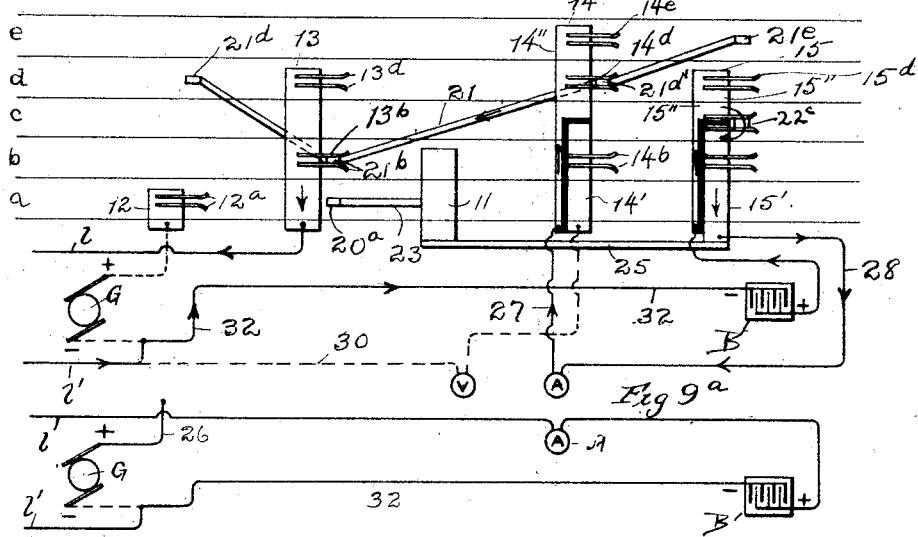

UNITED STATES PATENT OFFICE.

VINCENT G. APPLE, OF DAYTON, OHIO.

ELECTRIC DISTRIBUTION SYSTEM.

1,034,561.  Specification of Letters Patent.  Patented Aug. 6, 1912.

Application filed April 23, 1906. Serial No. 313,270.

*To all whom it may concern:*

Be it known that I, VINCENT G. APPLE, a citizen of the United States, residing at Dayton, in the county of Montgomery and State of Ohio, have invented certain new and useful Improvements in Electric Distribution Systems, of which the following is a specification.

My invention relates to improvements in electric distribution systems and the control thereof, and has for one of its primary objects to provide in association with parts and circuits of an electric distribution system susceptible of interconnection in various relations, a unitary means, preferably in the form of a rotary, unidirectional switch, for effecting the circuit connections necessary for such various operative associations of the parts of the system.

A further object of my invention is to provide controlling mechanism of the character described, which is simple in construction and easy of manufacture, capable of effecting the various combinations or connections of circuit wires associated with the several electrical devices of the system, that produce the different associations of parts desirable in the system.

Other and further objects of my invention will best become apparent to those skilled in the art from the following description, taken in conjunction with the accompanying drawings, illustrating an operative embodiment of my invention.

Figure 1:
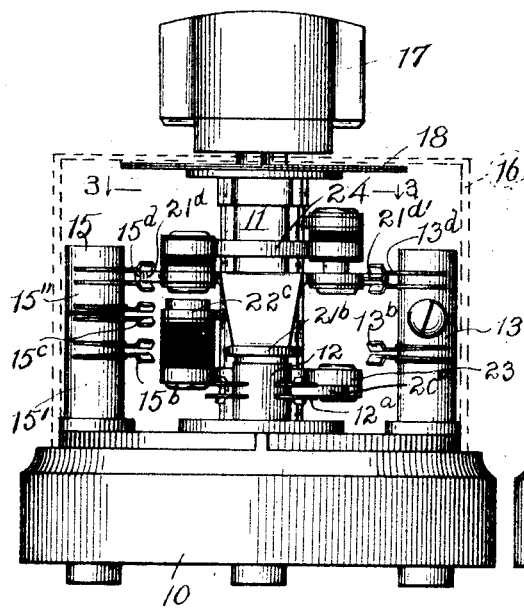
Figure 2:
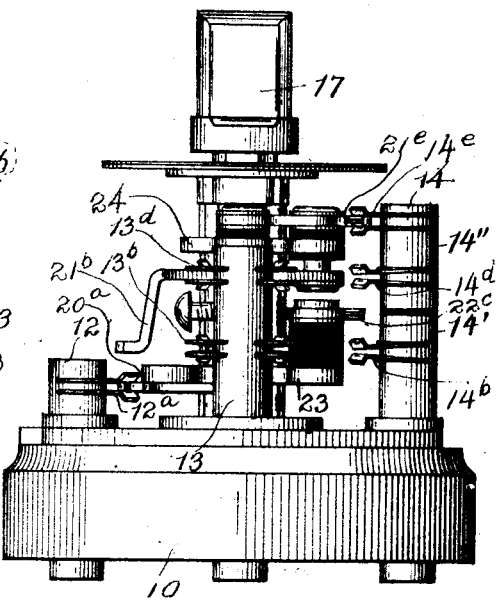
Figure 3:
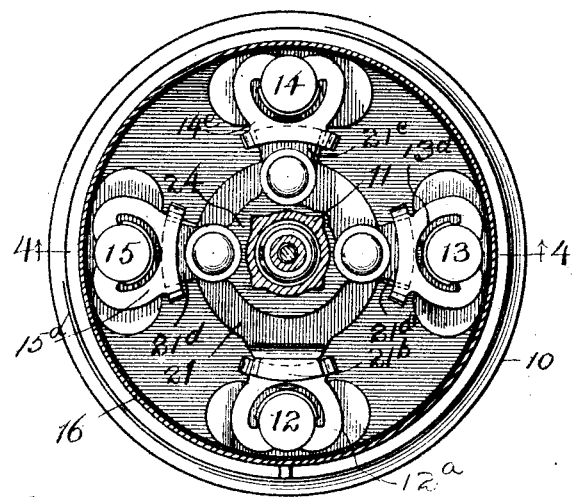

In said drawings: Figure 1 is a side elevation of a controlling switch constituting part of my invention; Fig. 2 is a similar view taken from the right of Fig. 1. Fig. 3 is a sectional view on line 3—3 of Fig. 1. Fig. 4 is a transverse section on line 4—4 of Fig. 3. Fig. 5 is a plan detail of the indicator dial. Fig. 6 and Fig. 6$^a$ are respectively a complete diagram and a simplified diagram of the connections established when the parts are in the position shown in Figs. 1 to 4. Figs. 7 and 7$^a$ are respectively complete and simplified diagrams of connections established when the movable switch element is moved one step in advance of the position shown in Fig. 1. Figs. 8 and 8$^a$ are similar views with the switch element advanced a second step. Figs. 9 and 9$^a$ are similar views with the switch element advanced a third step.

Throughout the drawings like numerals of reference refer always to like parts.

To describe first the switch structure employed, that its association with circuits hereafter referred to may be clearly understood, reference is made particularly to Figs. 1 to 5. In said figures 10 indicates a switch base, preferably of insulating material, whereon is mounted for rotation a suitable stem 11, about which are placed the four terminal posts 12, 13, 14 and 15. A cover or cap 16 may be provided above which projects the usual handle 17, the cover being preferably provided with a view opening 16' through which is exposed one of the various indications upon the dial 18 carried by and rotated with the stem 11. Preferably the stem construction is that of an ordinary four point snap switch, but the specific construction of the means for rotating the switch are immaterial to the present invention and need not be described.

For the purpose of effecting the various connections desirable in my system through the medium of blades of the rotary switch, I provide some of the various terminal posts with multiple contacts, arranged in different planes. In the specific embodiment shown the multiple contacts of the various posts are arranged in five different tiers or stories, as graphically illustrated in the diagrammatic views, wherein the successive tiers from the bottom upward are indicated in general by the letters $a, b, c, d$, and $e$. For convenient reference the contact parts of the several posts will be referred to by general numbers indicative of the posts whereby they are carried, with exponents indicative of the tiers in which they lie. The post 12 has a single pair of contact-fingers 12$^a$; and the post 13 is provided with superposed contacts 13$^b$ and 13$^d$. Each of these posts is solid throughout. Post 14 is made up of two sections insulated from each other, 14' being the lower section and 14'' the upper section. The lower section carries contact 14$^b$ and the upper section carries contacts 14$^d$ and 14$^e$. The post 15 is likewise composed of superposed sections insulated from each other, the lower section 15' carrying contact 15$^b$ and one finger of a pair constituting contact 15$^c$, the opposite finger whereof is carried by the uppermost section 15'' as is also the contact 15$^d$. Thus in the five tiers of contacts are provided one contact in tier $a$, carried by the post 12, three contacts in tier $b$ carried respectively by post 13 and the lower sections of posts 14 and 15; one contact in tier c the two fingers whereof are respectively carried by the upper and lower sections of post 15; three contacts in tier d, carried by post 13 and the upper sections of post 14 and 15 respectively, and one contact in tier e, carried by the upper section of post 14.

It will be understood that any suitable binding-post or other wire-connecting devices are associated with the various post sections or posts, for connecting them in suitable circuits to be described.

The rotatable center stem affords support for various blade parts arranged to be brought into operative relation with the several contact devices carried by the posts, the blade structures in the specific embodiment shown being divisible into three groups, one blade group comprising a single blade $20^a$, electrically connected with the stem 11; a second blade group, generally referred to as 21, comprising a plurality of blades, herein shown as four in number, and indicated at $21^b$, $21^d$, $21^e$ and $21^{d'}$ all connected together but insulated from the supporting structure; and a third group, of a single blade $22^c$, insulated from the supporting structure. Specifically, 23 indicates an annular support secured to and making electrical contact with the center stem 11 and carrying the blade $20^a$ in the plane of the lower tier $(a)$ of the contacts, for coöperation with the contact $12^a$. Carried by said member 23, but insulated therefrom and from stem 11, is a blade structure $22^c$, arranged for coaction with the contact pair $15^c$ to connect, when engaging said contact pair, the upper and lower sections $15''$, $15'$, of the post 15. A second support 24, is provided upon the stem, and from it is supported in any convenient manner the plate 21, having protruding therefrom contact $21^b$, arranged in the second tier directly above the contact $20^a$, and contacts $21^{d'}$ and $21^d$ oppositely disposed at right angles thereto in the fourth tier. The contact $21^e$, disposed opposite the blade $21^b$ and arranged in the uppermost tier $(e)$, is supported from and electrically connected to structure 21. These blades $21^b$ $21^d$, $21^e$ and $21^{d'}$ are, therefore, all interconnected for electrical continuity, and are insulated from the supporting structure 24 and the stem 11.

A permanent connection is afforded by a strip 25 (see Fig. 4), between the center stem 11 and the lower portion $15'$ of the post 15.

The function of the switch, broadly considered, is to effect various connections or combinations of a plurality of electrical instruments or tools, and more specifically to effect various combinations between a dynamo, a battery, a volt-meter, an ammeter, and the line, in an electrical distribution system. In the diagrammatic views G represents an electrical generator or dynamo; B represents a storage battery; V represents a volt-meter, and A represents an ammeter. Two line wires are indicated by the letters $l$, and $l'$. Permanent connections are effected between the various parts and the controlling switch as follows: From the positive pole of generator G a wire 26 is connected to the post 12; the post 13 is connected directly to the line wire $l$; the upper section of post 14 is connected by a wire 27 with one terminal of the ammeter A, and the opposite terminal of said ammeter is connected by wire 28 with the lower section $15'$ of post 15. The lower section of post 14 is connected by wire 29 with the volt-meter V, the opposite terminal of which is connected by wire 30 with the line wire $l'$, and the upper section of the post 15 is connected by wire 31 with the positive terminal of the storage battery, the negative terminal whereof is connected by wire 32 with the line wire $l'$. Said line wire $l'$ leads to the negative terminal of the generator G. It will be understood that these instruments and the various connections hereinafter described may be employed for various purposes, but for full disclosure I suggest, for example only, the employment of the parts in an electric ignition system for gas engines.

When the parts are in the position shown in Figs. 1 to 5, the view opening $16'$ in the casing displays upon the dial 18 the abbreviation Amp. Chg., indicative of "amperes charging" and connections are established through the switch from the generator through the ammeter, to the line and battery in parallel, so that the current flow may be measured while the battery is being charged. The specific connections established are shown in the diagrams Fig. 6 and Fig. $6^a$. Under these conditions the blade $20^a$ and part 23 connect post 12 with the stem 11, and thence connection is made by bar 25 with the base portion of post 15. Through the blade group 21, the post 13 (contact $13^d$ of which is engaged by a contact $21^d$) is connected to the upper section of post 14 (through blades $21^e$ and contact $14^e$) and thence with the upper section of post 15, (through the medium of blade $21^{d'}$ and contact $15^d$). The blades $21^b$ and $22^c$ are not connected with any contacts, as may be seen in Fig. 2. Under these conditions the current flow is as indicated by the arrows in Fig. 6, from the generator G by wire 26, post 12, thence by contact $12^a$ and blade $20^a$ to the stem 11 and by bar 25 to the lower portion of post 15, thence by wire 28 to the ammeter, and from its opposite terminal by wire 27 to the upper member of post 14. Here the current divides, one path being completed by the structure 21 to the blade $21^d$ contact $13^d$ of post 13, line wire $l$ and back by line wire $l'$ to the generator; and the other path extending through blade structure 21 and blade 21$^{d'}$ to contact 15$^d$ of the upper section of post 15, and thence by wire 31 to the battery B, returning by wire 32 to the line wire $l'$ and the generator. Under these conditions it will be manifest that the battery and generator being in parallel in their connection with the line, the battery is arranged to reinforce the generator should the line conditions require a heavy output of current, but should the line be broken or of greater resistance than the battery the generator will charge the battery, and under either condition the ammeter is included in series with the generator connection to show the ampere output of the generator.

If the switch be advanced one step in a clock-wise direction, so that all of the parts associated with the stem are thrown forward a quarter turn, the word "Off" upon the dial is brought before the view opening 16'. When the parts are in this position the contacts stand as illustrated in Fig. 7, the single blade 20$^a$ in the tier $a$ having moved away from the single contact 12$^a$ in said tier, so that the positive pole of the dynamo has no connection with any other element of the system, and the upper section 15'' of the post 15 having no connection through any blade with any other part so that the lead from the positive pole of the storage battery is open or disconnected from the associated elements. Consequently, as illustrated in the small diagram in Fig. 7$^a$ both sources of current supply are disconnected from each other, the line and the meters, so that no current flows in the system. Another quarter turn imparted to the switch stem brings the indication "Bat. Volts" signifying "battery volts", beneath the view aperture of the casing. In this position the contact blades are arranged as shown in Fig. 8, so that contact 15$^d$ of the upper section 15'' of post 15, contact 14$^b$ of the lower section 14' of post 14, and contact 13$^d$ of post 13 are connected together by blades 21$^{d'}$, 21$^b$ and 21$^d$ respectively of the insulated structure 21; blades 20$^a$, 21$^e$ and 22$^c$ of the switch being disconnected from any contacts. Under the conditions shown the dynamo is cut out of service, its positive pole being connected to the dead contact 12$^a$, but current flows from the storage battery by wire 31 to the upper section of post 15, thence through contact 15$^d$ and 21$^{d'}$ by the blade structure 21 to the lower section 14' of post 14 where the blade 21$^b$ is in connection with contact 14$^b$. Here the current divides, part thereof taking the course through the structure 21 to contact 21$^d$ which is connected through contact 13$^d$ with post 13, to which is connected one line wire $l$, the circuit being completed through the return wire $l'$ and wire 32 to the negative terminal of the battery. The other branch takes the course through the post section 14'', wire 29, voltmeter V, and wire 30 to the line wire $l'$, so that as best illustrated in Fig. 8$^a$, the battery is connected to supply current to the line and the volt-meter is bridged thereacross. When the switch stem is given another quarter turn, the indication "Amp. Dchg." (meaning "amperes discharging") upon the dial is brought beneath the view aperture of the casing and the contact parts are thrown to the position shown in Fig. 9; that is to say, blade 22$^c$ is brought into position to connect the two blades of the pair 15$^c$ which said blades are connected to the upper and lower members of the post 15, and contacts 13$^b$ and 14$^d$ are respectively engaged by blades 21$^b$ and 21$^{d'}$ so that the upper section of post 14 and the post 13 are electrically connected by the structure 21. In this position blades 21$^d$, 21$^e$ and 20$^a$ do not coöperate with any contacts, so that a circuit is established as follows: From the battery B current flows through wire 31 to the upper section of post 15 and through the blade 22$^c$ to the lower section of said post 15, thence through the line 28 to ammeter A, thence by wire 27 to post section 14''; thence by contact 14$^d$, blade 21$^{d'}$ and structure 21 to blade 21$^b$ and contact 13$^b$ of post 13, and from said post 13 to the line wire $l$, the circuit being completed by the line wire $l'$ and wire 32 direct to the battery. It will thus be apparent that as illustrated in the small diagram 9$^a$ the battery is connected to energize the line with the ammeter connected in series with the battery to show the amperage of the discharge of the battery. This completes the cycle of the switch, the next quarter turn imparted to its stem bringing the parts back to their initial position.

It will now be apparent that I have provided a simple, uni-directional, rotary switch capable of being set in four positions in which respectively its coacting blades and contacts effect connection of a generator through an ammeter to the line and storage battery in parallel; connection of the storage battery to the line for discharge with the volt-meter bridged across the line; connection of said battery to the line with the ammeter in series in the circuit, or disconnection of both battery and dynamo from the line and meters.

While I have herein described in some detail a specific embodiment of my invention, which I deem to be new in many of its details, and advantageous in the specific embodiment shown, it will be apparent that numerous changes might be made in the structure and connections without departure from the spirit and scope of my invention.

Having thus described my invention, what I claim and desire to secure by Letters Patent, of the United States, is:

1. In an electric distribution system, the combination with a dynamo, a storage battery, and an ammeter, of suitable circuit connections including line wires, and a unidirectional rotary switch comprising terminals for the circuit connections, and suitably grouped movable contacts for effecting at will connection either of the dynamo through the ammeter with the line and battery in parallel or of the storage battery through the ammeter with the line.

2. In an electric distribution system the combination with a dynamo, a storage battery, and an ammeter, of suitable circuit connections including the line wires, and a unidirectional rotary switch comprising terminals for said circuit connections and grouped contacts movable in unison, for effecting at will connection of the dynamo through the ammeter with the line and storage battery in parallel; connection of the battery with the line through the ammeter; and disconnection of both battery and dynamo from the line.

3. In an electric distribution system the combination with a dynamo, a storage battery and an ammeter, of suitable circuit connections including line wires, and a single means for effecting at will connection of the dynamo through the ammeter with the line and battery in parallel; and connection of the battery with the line through the ammeter, to the exclusion of the dynamo, said single means comprising appropriate terminals for the circuit connections, and grouped contacts movable in unison.

4. In an electric distribution system the combination with a dynamo, a storage battery, and a volt-meter, of suitable circuit connections including line wires, and a single switch for effecting at will connection between the dynamo and battery, excluding the volt-meter, and connection between the battery and the line including the volt-meter in bridge across the line, said switch comprising appropriate terminals for the circuit connections, and grouped contacts movable in unison.

5. In an electric distribution system the combination with a dynamo, a battery, and a volt-meter, of suitable circuit connections including the line wire, and a single unidirectional rotary switch comprising terminals for said circuit connections and grouped contacts movable in unison, for effecting at will connection between the dynamo and battery; connection between the battery and the line including the volt-meter in bridged relation to the line; and disconnection of both the dynamo and battery from each other and the line.

6. In an electric distribution system the combination with a dynamo, a storage battery, a volt-meter, and an ammeter, of suitable circuit connections including the line wires, and a single rotary switch comprising terminals for said circuit connections and grouped contacts movable in unison, adapted and arranged to establish at will connection of the dynamo through the ammeter to the line and battery in parallel; connection of the battery through the ammeter to the line to the exclusion of the dynamo, and connection of the battery to the line excluding the dynamo and ammeter, with the volt-meter in bridge across the line.

7. In an electric distribution system the combination with a dynamo, a storage battery, a volt-meter, and an ammeter, of suitable circuit connections including the line wires, and a single rotary, unidirectional switch comprising terminals for said circuit connections and grouped contacts movable in unison, adapted and arranged to establish at will any of the following connections, viz: of the dynamo through the ammeter to the line and battery in parallel; of the battery through the ammeter to the line; of the battery to the line with the volt-meter in bridge across the line; or disconnection of both battery and dynamo from each other and the line.

In testimony whereof I hereunto set my hand in the presence of two witnesses.

VINCENT G. APPLE.

In the presence of—
 ELMER E. ULLRICH,
 W. D. BROWN.